US009522983B2

(12) United States Patent
Eveson et al.

(10) Patent No.: US 9,522,983 B2
(45) Date of Patent: Dec. 20, 2016

(54) MANUFACTURING PROCESS FOR COATED POLYESTER FILM

(71) Applicant: DuPont Teijin Films U.S. Limited Partnership, Chester, VA (US)

(72) Inventors: Robert William Eveson, Yarm (GB); Andrew Nathan Hodgson, Cleveland (GB); Duncan Henry MacKerron, Middlesbrough (GB); Katsuyuki Hashimoto, Anpachi-gun (JP)

(73) Assignee: DUPONT TEIJIN FILMS U.S. LIMITED PARTNERSHIP, Chester, VA (US)

( * ) Notice: Subject to any disclaimer, the term of this patent is extended or adjusted under 35 U.S.C. 154(b) by 394 days.

(21) Appl. No.: 14/278,191

(22) Filed: May 15, 2014

(65) Prior Publication Data

US 2014/0295174 A1    Oct. 2, 2014

Related U.S. Application Data

(63) Continuation of application No. 12/278,819, filed as application No. PCT/GB2007/000453 on Feb. 9, 2007, now Pat. No. 8,802,226.

(30) Foreign Application Priority Data

Feb. 9, 2006   (GB) .................................. 0602678.5

(51) Int. Cl.
  C08J 7/04        (2006.01)
  B29C 71/02       (2006.01)
  B29K 67/00       (2006.01)

(52) U.S. Cl.
  CPC ................ *C08J 7/047* (2013.01); *B29C 71/02* (2013.01); *C08J 7/04* (2013.01); *B29C 2071/022* (2013.01);
  (Continued)

(58) Field of Classification Search
  CPC ................ Y10T 428/31786; Y10T 428/31663; Y10T 428/1086
  See application file for complete search history.

(56) References Cited

U.S. PATENT DOCUMENTS 3,443,950 A   5/1969   Rawlins, Jr.
3,504,075 A   3/1970   Williams, Jr. et al.
(Continued)

FOREIGN PATENT DOCUMENTS

CN    1476460 A    2/2004
CN    1497340 A    5/2004
(Continued)

OTHER PUBLICATIONS

A.R. Berens et al., "Prediction of Vinyl Chloride Monomer Migration From Rigid PVC Pipe," Polym. Eng. Sci., 16, 552 (1976).
(Continued)

*Primary Examiner* — Gregory Webb
(74) *Attorney, Agent, or Firm* — RatnerPrestia (57) ABSTRACT

A biaxially oriented composite film includes a polyester substrate supporting one or more coatings on one or both surfaces of said substrate,
  wherein the polyester substrate is a biaxially oriented film;
  wherein the one or more coatings is/are derived from a predominantly inorganic hardcoat coating composition including inorganic particles contained in a polymerisable predominantly inorganic matrix; and wherein the biaxially oriented composite film has been annealed at a temperature $T_a$ (° C.) above Tg where Tg<$T_a$≤Tg+100 (° C.) for a time t after thermal equilibrium where 1 hour ≤t≤72 hours. A method of making the film is provided.

31 Claims, 5 Drawing Sheets

(52) U.S. Cl.
CPC .... *B29K 2067/00* (2013.01); *B29K 2995/0048* (2013.01); *C08J 7/045* (2013.01); *C08J 2367/02* (2013.01); *Y10S 428/91* (2013.01); *Y10T 428/263* (2015.01); *Y10T 428/264* (2015.01); *Y10T 428/265* (2015.01); *Y10T 428/266* (2015.01); *Y10T 428/31663* (2015.04); *Y10T 428/31736* (2015.04); *Y10T 428/31786* (2015.04); *Y10T 428/31797* (2015.04)

(56) References Cited

U.S. PATENT DOCUMENTS

| | | | |
|---|---|---|---|
| 3,708,225 | A | 1/1973 | Misch et al. |
| 3,873,664 | A | 3/1975 | Curtis et al. |
| 3,986,997 | A | 10/1976 | Clark |
| 4,141,735 | A | 2/1979 | Schrader et al. |
| 4,177,315 | A | 12/1979 | Ubersax |
| 4,198,465 | A | 4/1980 | Moore et al. |
| 4,309,319 | A | 1/1982 | Vaughn, Jr. |
| 4,310,600 | A | 1/1982 | Cross |
| 4,436,851 | A | 3/1984 | Vaughn, Jr. |
| 4,455,205 | A | 6/1984 | Olsen et al. |
| 4,725,479 | A | 2/1988 | Utsumi |
| 4,847,033 | A | 7/1989 | Carroll, Jr. |
| 4,994,214 | A | 2/1991 | Stevens et al. |
| 5,021,091 | A | 6/1991 | Takarada et al. |
| 5,053,481 | A | 10/1991 | Ishii et al. |
| 5,240,532 | A | 8/1993 | Yu |
| 5,538,831 | A | 7/1996 | Oshima et al. |
| 5,545,364 | A | 8/1996 | Song et al. |
| 5,567,576 | A | 10/1996 | Suzuki et al. |
| 5,725,960 | A | 3/1998 | Konishi et al. |
| 5,895,212 | A | 4/1999 | Fujikura et al. |
| 5,910,356 | A | 6/1999 | Ishikawa et al. |
| 5,914,220 | A | 6/1999 | Murayama |
| 6,017,212 | A | 1/2000 | Fujikura et al. |
| 6,020,056 | A | 2/2000 | Walker et al. |
| 6,054,224 | A | 4/2000 | Nagai et al. |
| 6,071,682 | A | 6/2000 | Greener et al. |
| 6,129,980 | A | 10/2000 | Tsukada et al. |
| 6,132,951 | A | 10/2000 | Ezure et al. |
| 6,139,952 | A | 10/2000 | Furuya et al. |
| 6,171,758 | B1 | 1/2001 | Bhateja et al. |
| 6,198,217 | B1 | 3/2001 | Suzuki et al. |
| 6,228,499 | B1 | 5/2001 | Nakauchi et al. |
| 6,303,228 | B1 | 10/2001 | Watanabe et al. |
| 6,355,345 | B1 | 3/2002 | Furuya et al. |
| 6,355,703 | B1 | 3/2002 | Baba et al. |
| 6,358,601 | B1 | 3/2002 | Bilkadi |
| 6,376,060 | B1 | 4/2002 | Yoshihara et al. |
| 6,703,138 | B1 | 3/2004 | Taki et al. |
| 6,749,982 | B2 | 6/2004 | Rao et al. |
| 6,787,236 | B2 | 9/2004 | Kimura et al. |
| 6,841,272 | B2 | 1/2005 | Shoshi et al. |
| 6,926,945 | B2 | 8/2005 | Yano et al. |
| 6,942,831 | B2 | 9/2005 | Greener et al. |
| 7,022,388 | B2 | 4/2006 | Hashimoto et al. |
| 7,101,627 | B2 | 9/2006 | MacDonald et al. |
| 7,173,778 | B2 | 2/2007 | Jing et al. |
| 7,264,866 | B2 | 9/2007 | Hashimoto et al. |
| 7,468,197 | B2 | 12/2008 | Kurita et al. |
| 7,524,920 | B2 | 4/2009 | Pecorini et al. |
| 2004/0081839 | A1 | 4/2004 | Kubo et al. |
| 2004/0247916 | A1 | 12/2004 | MacDonald et al. |
| 2005/0238871 | A1* | 10/2005 | Robinson ............... C08J 7/047 428/331 |
| 2011/0209901 | A1* | 9/2011 | MacDonald ........... C08J 7/04 174/254 |

FOREIGN PATENT DOCUMENTS

| | | |
|---|---|---|
| CN | 1659248 | 8/2005 |
| DE | 4025613 | 2/1991 |
| EP | 0408197 | 1/1991 |
| EP | 0 419 400 A2 | 3/1991 |
| EP | 0429179 | 5/1991 |
| EP | 604079 | 6/1994 |
| EP | 0951991 | 10/1999 |
| EP | 1418197 | 5/2004 |
| EP | 1452309 | 9/2004 |
| JP | 54-68880 A | 6/1979 |
| JP | 61164814 | 7/1986 |
| JP | 62127229 | 6/1987 |
| JP | 62149415 | 7/1987 |
| JP | 02-158633 | 6/1990 |
| JP | 06-067346 | 3/1994 |
| JP | 09-204005 | 8/1997 |
| JP | 2000-227503 A | 8/2000 |
| JP | 2003-137337 | 5/2003 |
| JP | 2003-183429 | 7/2003 |
| JP | 2004-066642 A | 3/2004 |
| JP | 2004-099755 | 4/2004 |
| WO | WO 99/33910 | 7/1999 |
| WO | WO01/07508 | 2/2001 |
| WO | WO 03/022575 | 3/2003 |
| WO | WO03/087247 | 10/2003 |
| WO | WO 2005/012403 | 2/2005 |

OTHER PUBLICATIONS

A. Jayakrishnan, "Photocrosslinking of Azidated Poly(Vinyl Chloride) Coated Onto Plasticized PVC Surface: Route to Containing Plasticiser Migration," Journal of Applied Polymer Science, vol. 56, 1187-1195 (1995).

Yutaka Kawahara et al., "Oligomer Deposition on the Surface of Pet Fiber in Supercritical Carbon Dioxide Fluid," Macromolecular Materials and Engineering, 2006, 291, 11-15.

S. Reichlmaier et al., "Surface Trimer Crystallization on Poly (Ethylene Terephthalate) Studied by Time-of-Flight Secondary Ion Mass Spectrometry," Journal of Vacuum Science & Technology A 13(3), May/Jun. 1995 1217-1223.

Thomas J. Stanley et al., "Methylene Chloride Migration in Polycarbonate Packages: Effect of Initial Concentration Profile," Ind. Eng. Chem. Res., vol. 28, No. 6, 1989.

Vivian T. Stannett, "Barrier Properties and Migration Problems of Plastics," Polymer Engineering and Science, Nov. 1978, vol. 18, No. 15, pp. 1129-1134.

Black, Robert; Search Report; for Application No. GB 0602678.5, Jun. 2, 2006; 3 pp; The Patent Office; South Wales.

Black, Robert; Search Report; for Application No. GB 0602678.5, Dec. 6, 2006; 2 pp; The Patent Office; South Wales.

Black, Robert, Search Report under Section 17, for Application No. GB 0602678.5, dated Jun. 1, 2006, 1 page.

GB0602678.5; The Patent Office Search Report; Dec. 5, 2006; UK; 1 p.

Chinese Office Action for CN 2013102265888 issued Dec. 2, 2014, English translation only submitted.

Japanese Office Action and English translation for JP 201310226588.8 issued Dec. 2, 2014.

* cited by examiner

FIG. 1
Uncoated PEN

FIG. 2
Uncoated PET

FIG. 3
Example 10(a):PEN

FIG. 4
Example 10(b):PET

FIG. 8
Example 14(a):PEN

FIG. 9
Example 14(c):PET

MANUFACTURING PROCESS FOR COATED POLYESTER FILM

This application is a continuation of U.S. application Ser. No. 12/278,819, filed 8 Aug. 2008, which is a National Stage filing of PCT Application No. GB2007/000453, filed 9 Feb. 2007, and claims priority benefit of GB Application No. 0602678.5, filed 9 Feb. 2006, the entirety of which applications are incorporated herein by reference.

The present invention relates to improvements in polyester film to make it more suitable in applications such as electronic, photonic and optical assemblies or structures. During the manufacture of such assemblies or structures, the polyester film substrate is thermally processed at elevated temperatures, and this thermal treatment can result in the production of cyclic oligomers within the film, which can migrate to, and contaminate, the film surface, causing the film to become hazy.

BACKGROUND OF THE INVENTION

The migration or diffusion of small molecules through a solid polymeric medium has been intensively studied and characterised, because it forms the underlying principle of a number of important commercial applications. For example, containment of liquids and gases either in static reservoirs and tanks, or during transport along tubing and pipes clearly relies on very slow or zero diffusion by the mobile material through the walls of the plastic housing. Similarly for the purposes of packaging and shelf-life of materials, from food, drink and pharmaceuticals to commercial goods such as chemicals and electronics, plastic materials are required for packaging in which diffusion of specific gases or liquids is extremely slow. In the case of separation or purification using membranes the differential diffusion or transport of several gases or liquids through a solid membrane material is again the basis of permeation technology.

The phenomenon of diffusion of small molecules through a polymer medium also operates when issues of contamination arise. For example the migration of residual monomer out of a formed polymeric article can often cause unwanted contamination (A. R. Berens, C. A. Daniels, Polym. Eng. Sci., 16, 552 (1976)). Thus, industrial process steps have been developed which extract unreacted monomer from plastic before its use in final fabrication (V. T. Stannet, Polym. Eng. Sci., 18, 1129 (1978)). Similarly, if the polymer manufacturing process involves polymerisation or treatment in solution, traces of residual solvent, which remains occluded in the plastic will leach out of the material over time (T. J. Stanley, M. M. Alger, Ind. Eng. Chem. Res., 28, 865 (1989). The third, common low molecular weight material which is often found to migrate out of a commercial polymer, or article fabricated from it, is a plasticiser. In contrast to the former examples, a plasticiser is intentionally added or compounded into the plastic in order to modify its mechanical properties. However, it too will diffuse out of the polymer with time and present similar issues around contamination. For such systems, of which plasticised PVC is a familiar example, routes to improvement involve the development of new plasticisers (which are less mobile in the polymeric environment or more benign as a contaminant) or the use of physical barriers, impermeable coatings which prevent loss of the plasticisers from the plastic to its environment (A. Jayakrishnan et al., J. Appl. Polym. Sci., 56, 1187 (1995)).

Polyester materials represent an unusual example of a system which can contain low molecular weight molecules. These species are believed to originate from and exist in equilibrium with the parent polymer at temperatures above its melting range (Tm). As a consequence they originate at the manufacturing stage of the polymer. The low molecular weight material is predominantly a cyclic oligomer (trimer) and has a chemical structure identical to that of the high polymer. Its regular structure allows the cyclic oligomer to crystallise easily, thus under certain thermal treatments the material will diffuse to the surface of a solid polyester and crystallise (S. Reichlmaier et al., J. Vac. Sci. Tech., A13, 1217 (1995); and Y. Kawahara et al., Macromol. mater. Eng., 291, 11 (2006)). When this behaviour interferes with the performance of the polyester or its environment, the presence of the cyclic oligomers is seen as undesirable contamination, as a problem which requires a solution. Two approaches have been described to prevent the migration of a polyester cyclic oligomer to the surface of a polyester article either during further processing or in final service. In the first case, articles such as film or fibre are produced from a polyester raw material with a reduced initial content of cyclic oligomer. (Kawahara ibid; U.S. Pat. Nos. 6,020,056; and 6,054,224) This is successful when the fibre or film manufacturing process subjects the polyester to melt temperatures for a duration which is too short to allow the equilibrium level of oligomer to re-establish in the system. The second case involves laminating or coextruding an outer layer of plastic to the article which operates as a barrier to diffusion by the cyclic species to the new surface. This is successful if the laminated surface has properties which match or surpass those of the original polyester but often carries the disadvantage of higher cost (U.S. Pat. No. 5,545,364). To date, however, the use of a coating technology has not been previously applied to perform this function on polyester articles.

The polyester article of particular interest in the present application is film used in the field of flexible electronic or opto-electronic technology, as disclosed in, for instance, WO-A-03/022575. In particular, the film is a substrate on which electronic circuitry is manufactured and mounted in order to drive the electronic operation of the flexible device. The component which comprises the flexible substrate and circuitry is often described as a backplane. During the course of fabrication of the final backplane, the substrate is often exposed to conditions of elevated temperature for extended times. The development of physical contamination on its surface through the process of diffusion and crystallisation by cyclic oligomers is undesirable and can be immediately and conveniently recognised and measured as the appearance of haze on the film. There is a need to provide an improved barrier to the diffusion of cyclic oligomer from polyester film substrates which are exposed to conditions of elevated temperature for extended times in this technology.

The object of the present invention is to minimise or prevent the formation of haze in a polyester film substrate during the thermal processing thereof at elevated temperatures, for instance during the manufacture of electronic, photonic and optical assemblies or structures. It is a further object of this invention to minimise or prevent the formation of haze in a polyester film which has excellent dimensional stability.

SUMMARY OF THE INVENTION

The present invention provides the use of a coating composition selected from:

(i) an organic coating comprising a low molecular weight reactive diluent; an unsaturated oligomer; a solvent; and a photoinitiator;

(ii) an organic/inorganic hybrid coating comprising a low molecular weight reactive component and/or an unsaturated oligomeric component; a solvent; and inorganic particles, and optionally further comprising a photoinitiator;

(iii) a predominantly inorganic hardcoat comprising inorganic particles contained in a polymerisable predominantly inorganic matrix; and (iv) a composition comprising a cross-linkable organic polymer selected from polyethylene imine (PEI), polyester and polvinylalcohol (PVOH), and a cross-linking agent, for the purpose of preventing or minimising the formation of haze in a biaxially oriented polyester film during the annealing of said film above the glass transition temperature (Tg (° C.)) of said film.

The present invention further provides a method of preventing or minimising the formation of haze in a biaxially oriented polyester film during the annealing of said film above its glass transition temperature, said method comprising:

(a) selecting a biaxially oriented film having glass transition temperature (Tg (° C.));

(b) disposing a coating on one or both surfaces of said biaxially oriented film;

(c) annealing said coated biaxially oriented polyester film at a temperature above its glass transition temperature, wherein said coating composition is selected from:

(i) an organic coating comprising a low molecular weight reactive diluent; an unsaturated oligomer; a solvent; and a photoinitiator;

(ii) an organic/inorganic hybrid coating comprising a low molecular weight reactive component and/or an unsaturated oligomeric component; a solvent; and inorganic particles, and optionally further comprising a photoinitiator;

(iii) a predominantly inorganic hardcoat comprising inorganic particles contained in a polymerisable predominantly inorganic matrix; and (iv) a composition comprising a cross-linkable organic polymer selected from polyethylene imine (PEI), polyester and polvinylalcohol (PVOH), and a cross-linking agent.

DETAILED DESCRIPTION OF THE INVENTION

As used herein, the term "annealed" or "annealing" refers to the step of heating the film at elevated temperatures above its Tg, and relates to conditions experienced by the film in subsequent post-processing or fabrication, for instance in the manufacture of the backplanes referred to hereinabove. In one embodiment, the annealing is conducted at a temperature $T_a$ (° C.) above Tg where $Tg<T_a \leq Tg+100$ (° C.). In a further embodiment, the annealing is conducted for a time t after thermal equilibrium where 1 hour $\leq t \leq 72$ hours, typically wherein 1 hour $\leq t \leq 48$ hours, and more typically 1 hour $\leq t \leq 24$ hours. Following said annealing, the film is then cooled.

The inventors have unexpectedly found that the presence of the coating compositions disclosed herein, and particularly the hard-coating compositions, reduce the level of haze induced by high-temperature processing.

In one embodiment, the coating is present on both sides of the polyester substrate.

The term polyester as used herein includes a polyester homopolymer in its simplest form or modified, chemically and/or physically. In particular, the material to be treated by the annealing process is a biaxially oriented polymeric film comprising a layer of polyester or copolyester derived from:

(i) one or more diol(s);

(ii) one or more aromatic dicarboxylic acid(s); and (iii) optionally, one or more aliphatic dicarboxylic acid(s) of the general formula $C_nH_{2n}(COOH)_2$ wherein n is 2 to 8, wherein the aromatic dicarboxylic acid is present in the (co)polyester in an amount of from about 80 to about 100 mole % based on the total amount of dicarboxylic acid components in the (co)polyester. A copolyester may be a random, alternating or block copolyester.

The thickness of the film is preferably from about 12 to about 250 µm, more preferably from about 12 to about 150 µm, and typically is about 25-125 µm in thickness. The film is self-supporting by which is meant capable of independent existence in the absence of a supporting base.

The polyester is obtainable by condensing said dicarboxylic acids or their lower alkyl (up to 6 carbon atoms) diesters with one or more diols. The aromatic dicarboxylic acid is preferably selected from terephthalic acid, isophthalic acid, phthalic acid, 2,5-, 2,6- or 2,7-naphthalenedicarboxylic acid, and is preferably terephthalic acid or 2,6-naphthalenedicarboxylic acid, preferably 2,6-naphthalenedicarboxylic acid. The diol is preferably selected from aliphatic and cycloaliphatic glycols, e.g. ethylene glycol, 1,3-propanediol, 1,4-butanediol, neopentyl glycol and 1,4-cyclohexanedimethanol, preferably from aliphatic glycols. Preferably the copolyester contains only one glycol, preferably ethylene glycol. The aliphatic dicarboxylic acid may be succinic acid, glutaric acid, adipic acid, pimelic acid, suberic acid, azelaic acid or sebacic acid. Preferred homopolyesters are polyesters of 2,6-naphthalenedicarboxylic acid or terephthalic acid with ethylene glycol. A particularly preferred homopolyester is poly(ethylene naphthalate), and particularly polyesters of 2,6-naphthalenedicarboxylic acid with ethylene glycol.

Formation of the polyester is conveniently effected in a known manner by condensation or ester interchange, generally at temperatures up to about 295° C. For instance, the preferred PEN polyester can be synthesised by condensing 2,5-, 2,6- or 2,7-naphthalenedicarboxylic acid, preferably 2,6-naphthalenedicarboxylic acid, or a lower alkyl (up to 6 carbon atoms) diester thereof, with ethylene glycol. Typically, polycondensation includes a solid phase polymerisation stage. The solid phase polymerisation may be carried out on a fluidised bed, e.g. fluidised with nitrogen, or on a vacuum fluidised bed, using a rotary vacuum drier. Suitable solid phase polymerisation techniques are disclosed in, for example, EP-A-0419400 the disclosure of which is incorporated herein by reference. In one embodiment, the PEN is prepared using germanium catalysts which provide a polymeric material having a reduced level of contaminants such as catalyst residues, undesirable inorganic deposits and other byproducts of the polymer manufacture. The "cleaner" polymeric composition promotes improved optical clarity and surface smoothness. Preferably, PEN has a PET-equivalent intrinsic viscosity (IV) of 0.5-1.5, preferably 0.7-1.5, and in particular 0.79-1.0. An IV of less than 0.5 results in a polymeric film lacking desired properties such as mechanical properties whereas an IV of greater than 1.5 is difficult to achieve and would likely lead to processing difficulties of the raw material.

The Tg of a preferred homopolyester, PEN, is generally acknowledged to be 120° C., while that of the other preferred homopolyester, PET, is generally acknowledged to be 80° C. Copolyesters can exhibit Tg values either below or above those of the parent homopolymer depending on the nature of the comonomer which is incorporated. A film made from the polyester may exhibit Tg values higher than that of the polyester raw material, depending on the crystallinity of the film. Thus, as the crystallinity of the film increases, the polyester chains in the amorphous regions of the film become more restricted in their movement, meaning that the glass transition is observed at higher temperatures. For the avoidance of doubt, the annealing temperature ($T_a$) of the process of the present invention is dependent on the Tg of the polyester film, rather than the polyester raw material.

Formation of the film may be effected by conventional techniques well-known in the art. Conveniently, formation of the film is effected by extrusion, in accordance with the procedure described below. In general terms the process comprises the steps of extruding a layer of molten polymer, quenching the extrudate and orienting the quenched extrudate in at least one direction.

The film is biaxially-oriented. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties.

In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation.

In the preferred flat film process, the film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is generally effected so that the dimension of the oriented film is from 2 to 5, more preferably 2.5 to 4.5 times its original dimension in the or each direction of stretching. Typically, stretching is effected at temperatures higher than the Tg of the polyester, preferably about 15° C. higher than the Tg. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional support at a temperature above the glass transition temperature of the polyester but below the melting temperature thereof, to induce crystallisation of the polyester. During the heat-setting, a small amount of dimensional relaxation may be performed in the transverse direction, TD by a procedure known as "toe-in". Toe-in can involve dimensional shrinkage of the order 2 to 4% but an analogous dimensional relaxation in the process or machine direction, MD is difficult to achieve since low line tensions are required and film control and winding becomes problematic. The actual heat-set temperature and time will vary depending on the composition of the film and its desired final thermal shrinkage but should not be selected so as to substantially degrade the toughness properties of the film such as tear resistance. Within these constraints, a heat set temperature of about 180° to 245° C. is generally desirable.

The film may also, and indeed preferably is, further stabilized through use of an online relaxation stage. Alternatively the relaxation treatment can be performed off-line. In this additional step, the film is heated at a temperature lower than that of the heat-setting stage, and with a much reduced MD and TD tension. Film thus processed will exhibit a smaller thermal shrinkage than that produced in the absence of such post heat-setting relaxation.

In one embodiment, heat-setting and heat-stabilisation of the biaxially stretched film is conducted as follows. After the stretching steps have been completed, heat-setting is effected by dimensionally restraining the film at a tension in the range of about 19 to about 75 kg/m, preferably about 45 to about 50 kg/m of film width, using a heat-set temperature preferably from about 135° to about 250° C., more preferably 235-240° C. and a heating duration typically in the range of 5 to 40 secs, preferably 8 to 30 secs. The heat-set film is then heat-stabilised by heating it under low tension, preferably such that the tension experienced by the film is less than 5 kg/m, preferably less than 3.5 kg/m, more preferably in the range of from 1 to about 2.5 kg/m, and typically in the range of 1.5 to 2 kg/m of film width, typically using a temperature lower than that used for the heat-setting step and selected to be in the range from about 135° C. to 250° C., preferably 190 to 250° C., more preferably 200 to 230° C., and more preferably at least 215° C., typically 215 to 230° C., and for a duration of heating typically in the range of 10 to 40 sec, with a duration of 20 to 30 secs being preferred.

The heat-set, heat-stabilised film exhibits a very low residual shrinkage and consequently high dimensional stability. Preferably, the film exhibits a coefficient of linear thermal expansion (CLTE) within the temperature range from −40° C. to +100° C. of less than $40 \times 10^{-6}/°$ C., preferably less than $30 \times 10^{-6}/°$ C., more preferably less than $25 \times 10^{-6}/°$ C., more preferably less than $20 \times 10^{-6}/°$ C. Preferably, the film has a shrinkage at 30 mins at 230° C., measured as defined herein, of less than 1%, preferably less than 0.75%, preferably less than 0.5%, preferably less than 0.25%, and more preferably less than 0.1%. Preferably, the film has a residual dimensional change $\Delta L_r$ measured at 25° C. before and after heating the film from 8° C. to 200° C. and then cooling to 8° C., of less than 0.75%, preferably less than 0.5%, preferably less than 0.25%, and more preferably less than 0.1%, of the original dimension. In a particularly preferred embodiment, the substrate is a heat-stabilised, heat-set biaxially oriented film comprising poly(ethylene naphthalate) having the afore-mentioned shrinkage characteristics after 30 min at 230° C., and preferably having the afore-mentioned residual dimensional change $\Delta L_r$ characteristics.

The film may conveniently contain any of the additives conventionally employed in the manufacture of polyester films and which are known not to migrate out of the film, to its surface. The additive will not therefore contaminate the surface of the film during annealing and not contribute to the observed effect of surface haze. Thus, agents such as cross-linking agents, pigments and voiding agents, agents such as anti-oxidants, radical scavengers, UV absorbers, thermal stabilisers, flame retardants and inhibitors, which are solid, or bound covalently to the polyester and finally agents which are stable, non-migrating optical brighteners, gloss improvers, prodegradants, viscosity modifiers and dispersion stabilisers may be incorporated as appropriate. In particular, the film may comprise a particulate filler which can improve handling and windability during manufacture. The particulate filler may, for example, be a particulate inorganic filler (e.g. voiding or non-voiding metal or metalloid oxides, such as alumina, silica and titania, calcined china clay and alkaline metal salts, such as the carbonates and sulphates of calcium and barium), or an incompatible resin filler (e.g. polyamides and olefin polymers, particularly a homo- or co-polymer of a mono-alpha-olefin containing up to 6 carbon atoms in its molecule) or a mixture of two or more such fillers.

The components of the composition of a layer may be mixed together in a conventional manner. For example, by mixing with the monomeric reactants from which the film-forming polyester is derived, or the components may be mixed with the polyester by tumble or dry blending or by compounding in an extruder, followed by cooling and, usually, comminution into granules or chips. Masterbatching technology may also be employed.

In a preferred embodiment, the film is optically clear, preferably having a % of scattered visible light (haze) of <10%, preferably <6%, more preferably <3.5% and particularly <1.5%, measured according to the standard ASTM D 1003. In this embodiment, filler is typically present in only small amounts, generally not exceeding 0.5% and preferably less than 0.2% by weight of a given layer.

One or both surfaces of the polyester film has disposed thereon the coating materials referred to herein. The coating is preferably performed in-line.

In one embodiment, the coating which is to applied to one or both surfaces of the polyester film is a hardcoat or scratch resistant layer. The hardcoat layer provides a degree of mechanical protection to the film, as judged for example by the Taber abraser test (ASTM Method D-1044). The Taber Abrasion test will typically cause controlled damage to the surface of unprotected film such that under the standard conditions of treatment, the haze of the film is seen to increase by 40-50%. The use of a hardcoat resists the deterioration of the film surface under similar conditions and results in an increase in measured haze of the material of preferably no more than 20%, more preferably no more than 10% and most preferably no more than 5%. A further function of the hardcoat layer may be to provide a flat, planarised surface to the substrate film whose natural surface roughness may vary as a function of inorganic filler particles present in its composition. Suitable hardcoat layers which also impart a planarized character to the film surface fall broadly into one of the three following classifications; organic, organic/inorganic hybrid and predominantly inorganic coats.

Organic hard and planarizing coatings typically comprise (i) a photoinitiator, (ii) a low molecular weight reactive diluent (e.g. a monomeric acrylate), (iii) an unsaturated oligomer (e.g. acrylates, urethane acrylates, polyether acrylates, epoxy acrylates or polyester acrylates) and (iv) a solvent. As used herein, the term "low molecular weight" describes a polymerisable monomeric species. The term "reactive" signifies the polymerisability of the monomeric species. Such organic coatings can be cured by free radical reaction, initiated by a photolytic route. Specific formulations may vary according to the desired final properties. In one embodiment, the coating composition comprises a UV-curable mixture of monomeric and oligomeric acrylates (preferably comprising methylmethacrylate and ethylacrylate) in a solvent (such as methylethylketone), typically wherein the coating composition comprises the acrylates at about 20 to 30 wt % solids of the total weight of the composition, and further comprising a minor amount (e.g. about 1% by weight of the solids) of photoinitiator (e.g. Irgacure™ 2959; Ciba).

Organic/inorganic hybrid coatings comprise inorganic particles distributed throughout an organic polymeric matrix, which can contain component(s) similar to those described immediately above. The coatings are cured either thermally or by free radical reaction initiated by a photolytic route, and the presence of a photoinitiator is optional. The inorganic phase which is often silica or metal oxide particles is dispersed in the polymerisable organic matrix by a number of strategies. In one embodiment, an organic/inorganic hybrid coating comprises inorganic particles preferably selected from silica and metal oxides; and an organic component comprising a low molecular weight reactive component (e.g. monomeric acrylates) and/or an unsaturated oligomeric component (e.g. acrylates, urethane acrylates, polyether acrylates, epoxy acrylates and polyester acrylates); and a solvent, and optionally further comprising a photoinitiator. In a further embodiment, a thermally-curable hybrid coating comprises an epoxy resin in combination with inorganic (preferably silica) particles which are preferably present at a concentration of at least about 10% (preferably at least about 20%, and preferably no more than about 75%) by weight of the solids of the coating composition (which preferably comprises from 5 to about 20% by weight total solids in alcoholic solution). In a further embodiment, a UV-curable hybrid coating composition comprises monomeric acrylates (typically multi-functional acrylates) in combination with inorganic (preferably silica) particles in a solvent (such as methylethylketone), typically wherein the coating composition comprises the acrylates and silica at about 5 to 50 wt % solids of the total weight of the coating composition, and typically further comprising a minor amount (e.g. about 1% by weight of the solids) of photoinitiator. Multi-functional monomeric acrylates are known in the art, and examples include dipentaerythritol tetraacrylate and tris(2-acryloyloxyethyl) iso cyanurate.

A predominantly inorganic hardcoat comprises inorganic particles which are contained in a polymerisable predominantly inorganic matrix such as a polysiloxane. This type of hardcoat is cured thermally.

Suitable examples of a hardcoat and planarizing layer are disclosed in, for instance, U.S. Pat. Nos. 4,198,465, 3,708, 225, 4,177,315, 4,309,319, 4,436,851, 4,455,205, 0,142,362, WO-A-03/087247 and EP 1418197 the disclosures of which are incorporated herein by reference.

If present, the coating should preferably have a Tg which is above the temperature of the subsequent thermal processing or annealing.

In one embodiment, the hardcoat is derived from a coating composition comprising:
(a) from about 5 to about 50 weight percent solids, the solids comprising from about 10 to about 70 weight percent (preferably from about 20 to 60 wt %) silica and from about 90 to about 30 weight percent of a partially polymerized organic silanol of the general formula $RSi(OH)_3$, wherein R is selected from methyl and up to about 40% of a group selected from the group consisting of vinyl, phenyl, gamma-glycidoxypropyl, and gamma-methacryloxypropyl, and
(b) from about 95 to about 50 weight percent solvent, the solvent comprising from about 10 to about 90 weight percent water and from about 90 to about 10 weight percent lower aliphatic alcohol,
particularly wherein the coating composition has a pH of from about 3.0 to about 8.0, preferably from about 3.0 to about 6.5, preferably less than 6.2, preferably about 6.0 or less, and preferably at least 3.5, preferably at least 4.0.

The silica component of the preferred coating composition may be obtained, for example, by the hydrolysis of tetraethyl orthosilicate to form polysilicic acid. The hydrolysis can be carried out using conventional procedures, for example, by the addition of an aliphatic alcohol and an acid. Alternatively, the silica used in the instant coating compositions can be colloidal silica. The colloidal silica should generally have a particle size of about from 5-25 nm, and preferably about from 7-15 nm. Typical colloidal silicas which can be used in the instant invention include those commercially available as "Ludox SM", "Ludox HS-30" and "Ludox LS" dispersions (Grace Davison). The organic silanol component has the general formula $RSi(OH)_3$. At least about 60% of the R groups, and preferably about from 80% to 100% of these groups, are methyl. Up to about 40% of the R groups can be higher alkyl or aryl selected from vinyl, phenyl, gamma-glycidoxypropyl, and gamma-methacryloxypropyl. The solvent component generally comprises a mixture of water and one or more lower aliphatic alcohols. The water generally comprises about from 10 to 90 weight percent of the solvent, while the lower aliphatic alcohol complementarily comprises about from 90 to 10 weight percent. The aliphatic alcohols generally are those having from 1 to 4 carbon atoms, such as methanol, ethanol, n-propanol, iso-propanol, n-butanol, sec-butanol and tertiary butanol.

In a further embodiment, the coating composition comprises a cross-linkable organic polymer, for instance a polyethylene imine (PEI), polyester or polvinylalcohol (PVOH), and a cross-linking agent (such as Cymel™ 385 or those referred to hereinbelow), in a solvent (typically an aqueous solvent). In this embodiment, the coating composition preferably comprises PEI (preferably with a molecular weight (Mw) in the range 600,000 to 900,000).

The coating compositions can be applied using conventional coating techniques, including continuous as well as dip coating procedures. The coatings are generally applied at a dry thickness of from about 1 to about 20 microns, preferably from about 2 to 10 microns, and particularly from about 3 to about 10 microns. The coating composition can be applied either "off-line" as a process step distinct from the film manufacture, or "in-line" as a continuation of the film manufacturing process. The coating compositions, after application to the substrate, can be cured at a temperature of from about 20 to about 200° C., preferably from about 20 to about 150° C. While ambient temperatures of 20° C. require cure times of several days, elevated temperatures of 150° C. will cure the coatings in several seconds.

The exposed surface of the film may, if desired, be subjected to a chemical or physical surface-modifying treatment to improve the bond between that surface and a subsequently applied layer. A preferred treatment, because of its simplicity and effectiveness, is to subject the exposed surface of the film to a high voltage electrical stress accompanied by corona discharge. The preferred treatment by corona discharge may be effected in air at atmospheric pressure with conventional equipment using a high frequency, high voltage generator, preferably having a power output of from 1 to 20 kW at a potential of 1 to 100 kV. Discharge is conventionally accomplished by passing the film over a dielectric support roller at the discharge station at a linear speed preferably of 1.0 to 500 m per minute. The discharge electrodes may be positioned 0.1 to 10.0 mm from the moving film surface.

In a preferred embodiment, the substrate is coated, prior to application of the aforementioned coating, with a primer layer to improve adhesion of the substrate to the aforementioned coating composition. The primer layer may be any suitable adhesion-promoting polymeric composition known in the art, including polyester and acrylic resins. The primer composition may also be a mixture of a polyester resin with an acrylic resin. Acrylic resins may optionally comprise oxazoline groups and polyalkylene oxide chains. The polymer(s) of the primer composition is/are preferably water-soluble or water-dispersible.

Polyester primer components include those obtained from the following dicarboxylic acids and diols. Suitable di-acids include terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid, a dimer acid, and 5-sodium sulfoisophthalic acid. A copolyester using two or more dicarboxylic acid components is preferred. The polyester may optionally contain a minor amount of an unsaturated di-acid component such as maleic acid or itaconic acid or a small amount of a hydroxycarboxylic acid component such as p-hydroxybenzoic acid. Suitable diols include ethylene glycol, 1,4-butanediol, diethylene glycol, dipropylene glycol, 1,6-hexanediol, 1,4-cyclohexanedimethylol, xylene glycol, dimethylolpropane, poly(ethylene oxide) glycol, and poly(tetramethylene oxide) glycol. The glass transition point of the polyester is preferably 40 to 100° C., further preferably 60 to 80° C. Suitable polyesters include copolyesters of PET or PEN with relatively minor amounts of one or more other dicarboxylic acid comonomers, particularly aromatic di-acids such as isophthalic acid and sodium sulphoisophthalic acid, and optionally relatively minor amounts of one or more glycols other than ethylene glycol, such as diethylene glycol.

In one embodiment, the primer layer comprises an acrylate or methacrylate polymer resin. The acrylic resin may comprise one or more other comonomers. Suitable comonomers include alkyl acrylates, alkyl methacrylates (where the alkyl group is preferably methyl, ethyl, n-propyl, isopropyl, n-butyl, isobutyl, t-butyl, 2-ethylhexyl, cyclohexyl or the like); hydroxy-containing monomers such as 2-hydroxyethyl acrylate, 2-hydroxyethyl methacrylate, 2-hydroxypropyl acrylate, and 2-hydroxypropyl methacrylate; epoxy group-containing monomers such as glycidyl acrylate, glycidyl methacrylate, and allyl glycidyl ether; carboxyl group or its salt-containing monomers, such as acrylic acid, methacrylic acid, itaconic acid, maleic acid, fumaric acid, crotonic acid, styrenesulfonic acid and their salts (sodium salt, potassium salt, ammonium salt, quaternary amine salt or the like); amide group-containing monomers such as acrylamide, methacrylamide, an N-alkylacrylamide, an N-alkylmethacrylamide, an N,N-dialkylacrylamide, an N,N-dialkyl methacrylate (where the alkyl group is preferably selected from those described above), an N-alkoxyacrylamide, an N-alkoxymethacrylamide, an N,N-dialkoxyacrylamide, an N,N-dialkoxymethacrylamide (the alkoxy group is preferably methoxy, ethoxy, butoxy, isobutoxy or the like), acryloylmorpholine, N-methylolacrylamide, N-methylolmethacrylamide, N-phenylacrylamide, and N-phenylmethacrylamide; acid anhydrides such as maleic anhydride and itaconic anhydride; vinyl isocyanate, allyl isocyanate, styrene, a-methylstyrene, vinyl methyl ether, vinyl ethyl ether, a vinyltrialkoxysilane, a monoalkyl maleate, a monoalkyl fumarate, a monoalkyl itaconate, acrylonitrile, methacrylonitrile, vinylidene chloride, ethylene, propylene, vinyl chloride, vinyl acetate, and butadiene. In a preferred embodiment, the acrylic resin is copolymerised with one or more monomer(s) containing oxazoline groups and polyalkylene oxide chains. The oxazoline group-containing monomer includes 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-methyl-2-oxazoline. One or more comonomers may be used. 2-Isopropenyl-2-oxazoline is preferred. The polyalkylene oxide chain-containing monomer includes a monomer obtained by adding a polyalkylene oxide to the ester portion of acrylic acid or methacrylic acid. The polyalkylene oxide chain includes polymethylene oxide, polyethylene oxide, polypropylene oxide, and polybutylene oxide. It is preferable that the repeating units of the polyalkylene oxide chain are 3 to 100.

Where the primer composition comprises a mixture of polyester and acrylic components, particularly an acrylic resin comprising oxazoline groups and polyalkylene oxide chains, it is preferable that the content of the polyester is 5 to 95% by weight, preferably 50 to 90% by weight, and the content of the acrylic resin is 5 to 90% by weight, preferably 10 to 50% by weight.

Other suitable acrylic resins include:
(i) a copolymer of (a) 35 to 40 mole % alkyl acrylate, (b) 35 to 40% alkyl methacrylate, (c) 10 to 15 mole % of a comonomer containing a free carboxyl group such as itaconic acid, and (d) 15 to 20 mole % of an aromatic sulphonic acid and/or salt thereof such as p-styrene sulphonic acid, an example of which is a copolymer comprising ethyl acrylate/methyl methacrylate/itaconic acid/p-styrene sulphonic acid and/or a salt thereof in a ratio of 37.5/37.5/10/15 mole %, as disclosed in EP-A-0429179 the disclosure of which is incorporated herein by reference; and
(ii) an acrylic and/or methacrylic polymeric resin, an example of which is a polymer comprising about 35 to 60 mole % ethyl acrylate, about 30 to 55 mole % methyl methacrylate and about 2 to 20 mole % methacrylamide, as disclosed in EP-A-0408197 the disclosure of which is incorporated herein by reference.

The primer or adherent layer may also comprise a cross-linking agent which improves adhesion to the substrate and should also be capable of internal cross-linking. Suitable cross-linking agents include optionally alkoxylated condensation products of melamine with formaldehyde. The primer or adherent layer may also comprise a cross-linking catalyst, such as ammonium sulphate, to facilitate the cross-linking of the cross-linking agent. Other suitable cross-linking agents and catalysts are disclosed in EP-A-0429179, the disclosures of which are incorporated herein by reference.

A further suitable primer, particularly for use in association with the hard-coats described hereinabove, is disclosed in U.S. Pat. No. 3,443,950, the disclosure of which is incorporated herein by reference.

The coating of the primer layer onto the substrate may be performed in-line or off-line, but is preferably performed "in-line", and preferably between the forward and sideways stretches of a biaxial stretching operation.

The coated and subsequently annealed films preferably have a % of scattered visible light (haze) of <10%, preferably <6%, more preferably <3.5% and particularly <1.5%, measured according to the standard ASTM D 1003 after annealing at a temperature $T_a$ (° C.) above Tg where $Tg<T_a\leq Tg+100$ (° C.) for a time t after thermal equilibrium where 1 hour $\leq t\leq 72$ hours, and in a specific embodiment after annealing at Tg +80° C. for 30 hours.

In a preferred embodiment, the method of the present invention reduces haze formation during annealing at a temperature $T_a$ (° C.) above Tg where $Tg<T_a\leq Tg+100$ (° C.) for a time t after thermal equilibrium where 1 hour $\leq t\leq 72$ hours, and particularly during annealing at Tg+80° C. for 30 hours, such that the haze of the annealed coated film is preferably no more than a 10% increase on the initial average haze value of the coated film (i.e. before annealing), preferably no more than a 6% increase, preferably no more than a 3.5% increase, preferably no more than a 1.5% increase, and preferably no more than a 1.0% increase.

In one embodiment of the present invention, the coated and subsequently annealed films exhibit a surface having an Ra value, as measured herein, of less than 0.7 nm, preferably less than 0.6 nm, preferably less than 0.5 nm, preferably less than 0.4 nm, preferably less than 0.3 nm, and ideally less than 0.25 nm, and/or an Rq value, as measured herein, of less than 0.9 nm, preferably less than 0.8 nm, preferably less than 0.75 nm, preferably less than 0.65 nm, preferably less than 0.6 nm, preferably less than 0.50 nm, preferably 0.45 nm or lower, preferably less than 0.35 nm, and ideally less than 0.3 nm.

It will be appreciated that, in the present invention, the dimensional stability characteristics described herein refer to the uncoated heat-stabilised, heat-set, biaxially oriented polyester film.

The coated polyester film is suitable for use as a substrate in any application which requires subsequent processing of the substrate at elevated temperatures, particularly at a temperature $T_a$(° C.) above Tg where $Tg<T_a\leq Tg+100$ (° C.) and particularly for a time t after thermal equilibrium where 1 hour $\leq t\leq 72$ hours. Of particular interest is the use of the coated film as a substrate for, and in the manufacture of, flexible electronic, photonic and optical assemblies or structures, and particularly in the manufacture of the backplanes referred to above. Electronic and opto-electronic devices may comprise a conductive polymer, and examples include an electroluminescent (EL) device (particularly an organic light emitting display (OLED)), a photovoltaic cell and semiconductor devices (such as organic field effect transistors, thin film transistors and integrated circuits generally). In one embodiment, the term "electroluminescent display device", and particularly the term "organic light emitting display (OLED) device", as used herein refers to a display device comprising a layer of light-emitting electroluminescent material (particularly a conductive polymeric material) disposed between two layers each of which comprises an electrode, wherein the resultant composite structure is disposed between two substrate (or support or cover) layers. In one embodiment, the term "photovoltaic cell" as used herein refers to a device comprising a layer of conductive polymeric material disposed between two layers each of which comprises an electrode, wherein the resultant composite structure is disposed between two substrate (or support or cover) layers. In one embodiment, the term "transistor" as used herein refers to a device comprising at least one layer of conductive polymer, a gate electrode, a source electrode and a drain electrode, and one or more substrate layers. Thus, in one embodiment, the method and use referred to hereinabove include the step of disposing an electrode layer on the coated substrate described hereinabove, in accordance with conventional manufacturing techniques known in the art, and the composite film referred to hereinabove further comprises an electrode layer (optionally transparent or translucent) on the coated substrate. The electrode layer may be a layer, or a patterned layer, of a suitable conductive material as known in the art, for instance gold or a conductive metal oxide such as indium tin oxide. In a further embodiment, the composite film described hereinabove may further comprise a layer which exhibits barrier properties to water vapour and/or oxygen transmission, particularly such that the water vapour transmission rate is less than $10^{-6}$ g/m²/day and/or the oxygen transmission rate is less than $10^{-5}$ /mL/m²/day, and which is typically applied prior to application of the electrode layer. Such a barrier layer may be organic or inorganic (preferably inorganic), and is typically applied by vacuum deposition or sputtering techniques. Materials which are suitable for use to form a barrier layer are disclosed, for instance, in U.S. Pat. No. 6,198,217 and WO-A-03/087247, the disclosures of which are incorporated herein by reference.

Property Measurement

The following approaches were used to characterize the film properties which changed as a consequence of the process described herein:

(i) Thermal shrinkage was assessed for film samples of dimensions 200 mm×10 mm which were cut in specific directions relative to the machine and transverse directions of the film and marked for visual measurement. The longer dimension of the sample (i.e. the 200 mm dimension) corresponds to the film direction for which shrinkage is being tested, i.e. for the assessment of shrinkage in the machine direction, the 200 mm dimension of the test sample is oriented along the machine direction of the film. After heating the specimen to the predetermined temperature (by placing in a heated oven at that temperature) and holding for an interval of 30 minutes, it was cooled to room temperature and its dimensions re-measured manually. The thermal shrinkage was calculated and expressed as a percentage of the original length.

(ii) When a sample of film is examined on a flat surface, it can often exhibit a physical curl. This can arise from its process history, or through a second, slower creep process under permanent physical distortion. The curl of a film can be assessed by a simple physical measurement of the "lift" or height from a flat surface, to which the edge or corner of a specimen is raised. Thus curl was measured of samples of film 100 mm×10 mm in dimension, cut in a specific direction relative to the parent roll (i.e. such that the 100 mm dimension corresponded to the film direction for which the measurement is desired) and which were laid on a flat, horizontal surface. The lift was measured for each corner and an average calculated.

(iii) For film samples which were essentially transparent, that is containing sufficiently low levels of additive, pigment, void or other body which would render it opaque, film clarity was evaluated. This was achieved by measuring total luminance transmission (TLT) and haze (% of scattered transmitted visible light) through the total thickness of the film using a Gardner XL 211 hazemeter in accordance with ASTM D-1003-61.

(iv) The glass transition temperature (Tg) of the polyester film was measured using Differential Scanning Calorimetry (DSC) techniques. The measurement was performed using a TA Instruments Q100 DSC System, calibrated using an indium standard. Samples of film were heated from below ambient temperature (approximately −20° C.) to 300° C. and final values of temperature were reported for a heating rate of 20° K/minute. The Tg is measured in respect of the biaxially oriented polyester film before it is exposed to the annealing process of the invention described herein and, for the avoidance of doubt, it is this value of Tg which is used to determine the annealing temperature ($T_a$) of the process.

(v) Dimensional stability may be assessed in terms of either (a) the coefficient of linear thermal expansion (CLTE) or (b) a temperature cycling method wherein the residual change in length along a given axis is measured after heating the film to a given temperature and subsequently cooling the film.

Both methods of measurements were conducted using a Thermomechanical Analyser PE-TMA-7 (Perkin Elmer) calibrated and checked in accordance with known procedures for temperature, displacement, force, eigendeformation, baseline and furnace temperature alignment. The films were examined using extension analysis clamps. The baseline required for the extension clamps was obtained using a very low coefficient of expansion specimen (quartz) and the CLTE precision and accuracy (dependent on post-scan baseline subtraction) was assessed using a standard material, e.g. pure aluminium foil, for which the CLTE value is well known. The specimens, selected from known axes of orientation within the original film samples, were mounted in the system using a clamp separation of approx. 12 mm and subjected to an applied force of 75 mN over a 5 mm width. The applied force was adjusted for changes in film thickness, i.e. to ensure consistent tension, and the film was not curved along the axis of analysis. Specimen lengths were normalised to the length measured at a temperature of 23° C.

In the CLTE test method (a), specimens were cooled to 8° C., stabilised, then heated at 5° C./min from 8° C. to +240° C. The CLTE values (a) were derived from the formula:

$$\alpha = \Delta L/(L \times (T_2 - T_1))$$

where $\Delta L$ is the measured change in length of the specimen over the temperature range ($T_2-T_1$), and L is the original specimen length at 23° C. CLTE values are considered reliable up to the temperature of the Tg.

The data can be plotted as a function of the % change in specimen length with temperature, normalised to 23° C.

In the temperature cycling test method (b), a procedure similar to that of method (a) was used wherein the temperature was cycled between 8° C. and several elevated temperatures. Thus, film samples were heated from 8° C. to 140° C., 160° C., 180° C. or 200° C. and then cooled to 8° C. The length along each of the transverse and machine directions was measured at 25° C. before and after this heat treatment and the change in length $\Delta L_r$ calculated as percentage of the original length.

(vi) Intrinsic Viscosity (IV)

The IV was measured by melt viscometry, using the following procedure. The rate of flow pre-dried extrudate through a calibrated die at known temperature and pressure is measured by a transducer which is linked to a computer. The computer programme calculates melt viscosity values ($\log_{10}$ viscosity) and equivalent IVs from a regression equation determined experimentally. A plot of the IV against time in minutes is made by the computer and the degradation rate is calculated. An extrapolation of the graph to zero time gives the initial IV and equivalent melt viscosity. The die orifice diameter is 0.020 inches, with a melt temperature of 284° C. for IV up to 0.80, and 295° C. for IV>0.80.

(vii) Oxygen transmission rate is measured using ASTM D3985.

(viii) Water vapour transmission rate is measured using ASTM F1249.

(ix) Surface Smoothness

Surface smoothness is measured using conventional non-contacting, white-light, phase-shifting interferometry techniques, which are well-known in the art, using a Wyko NT3300 surface profiler using a light source of wavelength 604 nm. With reference to the WYKO Surface Profiler Technical Reference Manual (Veeco Process Metrology, Ariz., US; June 1998; the disclosure of which is incorporated herein by reference), the characterising data obtainable using the technique include:

Averaging Parameter—Roughness Average (Ra): the arithmetic average of the absolute values of the measured height deviations within the evaluation area and measured from the mean surface.

Averaging Parameter—Root Mean Square Roughness (Rq): the root mean square average of the measured height deviations within the evaluation area and measured from the mean surface.

Extreme Value Parameter—Maximum Profile Peak Height (Rp): the height of the highest peak in the evaluation area, as measured from the mean surface.

Averaged Extreme Value Parameter—Average Maximum Profile Peak Height (Rpm): the arithmetic average value of the ten highest peaks in the evaluation area.

Extreme Peak Height Distribution: a number distribution of the values of Rp of height greater than 200 nm.

Surface Area Index: a measure of the relative flatness of a surface.

The roughness parameters and peak heights are measured relative to the average level of the sample surface area, or "mean surface", in accordance with conventional techniques. (A polymeric film surface may not be perfectly flat, and often has gentle undulations across its surface. The mean surface is a plane that runs centrally through undulations and surface height departures, dividing the profile such that there are equal volumes above and below the mean surface.)

The surface profile analysis is conducted by scanning discrete regions of the film surface within the "field of view" of the surface profiler instrument, which is the area scanned in a single measurement. A film sample may be analysed using a discrete field of view, or by scanning successive fields of view to form an array. The analyses conducted herein utilised the full resolution of the Wyko NT3300 surface profiler, in which each field of view comprises 480×736 pixels.

For the measurement of Ra and Rq, the resolution was enhanced using an objective lens having a 50-times magnification. The resultant field of view has dimensions of 90 µm×120 µm, with a pixel size of 0.163 µm.

For the measurement of Rp and Rpm, the field of view is conveniently increased using an objective lens having a 10-times magnification in combination with a "0.5-times field of view of multiplier" to give a total magnification of 5-times. The resultant field of view has dimensions of 0.9 mm×1.2 mm, with a pixel size of 1.63 µm. Preferably Rp is less than 100 nm, more preferably less than 60 nm, more preferably less than 50 nm, more preferably less than 40 nm, more preferably less than 30 nm, and more preferably less than 20 nm.

For the measurement of Ra and Rq herein, the results of five successive scans over the same portion of the surface area are combined to give an average value. The data presented below in respect of Rp are an average value from 100 measurements. The measurements were conducted using a modulation threshold (signal : noise ratio) of 10%, i.e. data points below the threshold are identified as bad data.

The surface topography can also be analysed for the presence of extreme peaks having a height of greater than 200 nm. In this analysis, a series of measurements of Rp are taken with a pixel size of 1.63 µm over a total area of 5 $cm^2$. The results may be presented in the form of a histogram in which the data-points are assigned to pre-determined ranges of peak heights, for instance wherein the histogram has equally-spaced channels along the x-axis of channel width 25nm. The histogram may be presented in the form of a graph of peak count (y axis) versus peak height (x axis). The number of surface peaks in the range 300 to 600 nm per 5 $cm^2$ area, as determined from Rp values, may be calculated, and designated as N(300-600). The coatings used in the present invention preferably result in a reduction of N(300-600) in the annealed film, such that the reduction F, which is the ratio of N(300-600) without and with the coating, is at least 5, preferably at least 15, and more preferably at least 30. Preferably, the N(300-600) value of the coated and subsequently annealed film is less than 50, preferably less than 35, preferably less than 20, preferably less than 10, and preferably less than 5 peaks per 5 $cm^2$ area.

The Surface Area Index is calculated from the "3-dimensional surface area" and the "lateral surface area" as follows. The "3-dimensional (3-D) surface area" of a sample area is the total exposed 3-D surface area including peaks and valleys. The "lateral surface area" is the surface area measured in the lateral direction. To calculate the 3-D surface area, four pixels with surface height are used to generate a pixel located in the centre with X, Y and Z dimensions. The four resultant triangular areas are then used to generate approximate cubic volume. This four-pixel window moves through the entire data-set. The lateral surface area is calculated by multiplying the number of pixels in the field of view by the XY size of each pixel. The surface area index is calculated by dividing the 3-D surface area by the lateral area, and is a measure of the relative flatness of a surface. An index which is very close to unity describes a very flat surface where the lateral (XY) area is very near the total 3-D area (XYZ).

A Peak-to-Valley value, referred to herein as "$PV_{95}$", may be obtained from the frequency distribution of positive and negative surface heights as a function of surface height referenced to the mean surface plane. The value $PV_{95}$ is the peak-to-valley height difference which envelops 95% of the peak-to-valley surface height data in the distribution curve by omitting the highest and lowest 2.5% of datapoints. The $PV_{95}$ parameter provides a statistically significant measure of the overall peak-to-valley spread of surface heights.

The invention is further illustrated by the following examples. The examples are not intended to limit the invention as described above. Modification of detail may be made without departing from the scope of the invention.

EXAMPLES

Comparative Example 1

Preparation of Uncoated PEN Film

A polymer composition comprising PEN was extruded and cast onto a hot rotating polished drum. The film was then fed to a forward draw unit where it was stretched over a series of temperature-controlled rollers in the direction of extrusion to approximately 3.1 times its original dimensions. The draw temperature was approximately 130° C. The film was then passed into a stenter oven at a temperature of 135° C. where the film was stretched in the sideways direction to approximately 3.4 times its original dimensions. The biaxially stretched film was then heat-set at temperatures up to 235° C. by conventional means before being cooled and would onto reels. The total thickness was 125 µm. The heat-set biaxially stretched film was then unwound and then further heat-stabilised in a roll-to-roll process by passing the film through an additional set of ovens, of which the maximum temperature was 190° C. The film was unsupported at its edges and transported through the ovens under a low line tension, allowing it to relax and stabilize further.

Reference Examples 1-9

Annealing of Uncoated PEN Film

The procedure in comparative example 1 was repeated and a single sheet of the film obtained by that process further treated by annealing in a circulating air oven. The conditions are summarized in Table 1, together with the optical properties (haze and TLT).

TABLE 1

| Sample | Annealing Temperature, C. | Annealing Time, hrs | Haze (%) | TLT (%) |
|---|---|---|---|---|
| C. Ex. 1 | — | — | 0.82 | 86.8 |
| Ref. Ex. 1 | 95 | 24 | 1.02 | 86.9 |
| Ref. Ex. 2 | 115 | 1 | 0.97 | 86.8 |
| Ref. Ex. 3 | 115 | 10 | 1.06 | 85.2 |
| Ref. Ex. 4 | 115 | 24 | 1.15 | 86.8 |
| Ref. Ex. 5 | 115 | 100 | 1 | 86.7 |
| Ref. Ex. 6 | 135 | 24 | 1.77 | 86.8 |
| Ref. Ex. 7 | 155 | 24 | 5.63 | 86.9 |
| Ref. Ex. 8 | 175 | 24 | 15.06 | 86.7 |
| Ref. Ex. 9 | 195 | 24 | 30.09 | 86.2 |

It is clear that increasing the temperature of annealing results in higher haze in the film sample. The haze which develops in each sample is known to be caused by crystals of cyclic oligomer. The oligomer present in the bulk of the film diffuses to the surface where it sublimes and crystallizes. This process intensifies at elevated temperature and it is clear from the data that haze becomes significant as the temperature increases. For many applications, this surface deposit would impair the performance and limit the attractiveness of the film. Techniques which are commonly used to clean a film surface would otherwise be needed to render useable films which have been annealed at high temperatures. The 10 present invention addresses the surface deposition of oligomeric material during annealing by preventing the migration of the oligomer from the bulk of the film, thereby preventing or minimising surface oligomer deposition.

Control Example 1

Preparation of a Coated PEN Film

The procedure in comparative example 1 was repeated except that the draw ratio applied in the direction of extrusion (MD) was increased to 3.3 and during the heat setting stage, the transverse dimensions of the web were reduced by 4%. During manufacture, the film was also treated on both surfaces with a primer coating, to promote adhesion to a subsequent, thicker coating. The biaxially stretched, heat-set, surface-primed and offline-stabilized film was then unwound and further modified on both sides by coating with a material designed to cure to a hard, smooth finish, and again heated, cooled and rewound. The coating was of the inorganic hardcoat type described previously and disclosed in WO-A-03/087247. It was prepared before application by the following steps:
(i) 517 cm$^3$ of methyltrimethoxysilane (obtained from OSi Specialities) was added to 1034 cm3 demineralised water at room temperature and stirred for 24 hours.
(ii) 54 cm$^3$ of 3-glycidoxypropyl trimethoxysilane (obtained from Aldrich Chemical Company) was added to 108 cm$^3$ of demineralised water at room temperature and stirred for 24 hours.
(iii) 53 cm$^3$ of 10% aqueous acetic acid (Aldrich Chemical Company) was added to 700 cm3 of Ludox LS colloidal silica (12 nm). To this was added 162 cm$^3$ of the hydrolysed 3-glycidoxypropyl trimethoxysilane/water mixture and 1551 cm$^3$ of the hydrolysed methyltrimethoxysilane/water mixture. This mixture was stirred for 12 hours before coating. The final pH of the composition was 6.05.

The coating was applied to both surfaces of the polyester film, to a thickness of 3 and crosslinked thermally.

Examples 1-9

Annealing the Coated PEN Film of Control Example 1

A single sheet of the film of control example 1 was further treated by annealing in a circulating air oven. The conditions are summarized in Table 2, together with the corresponding optical properties (haze and TLT values).

TABLE 2

| Sample | Annealing Temperature, C. | Annealing Time, hrs | Haze (%) | TLT (%) |
|---|---|---|---|---|
| Control Ex. 1 | — | — | 0.42 | 91.4 |
| Example 1 | 95 | 24 | 0.66 | 91.3 |
| Example 2 | 115 | 1 | 0.43 | 91.4 |
| Example 3 | 115 | 10 | 0.44 | 91.4 |
| Example 4 | 115 | 24 | 0.47 | 91.4 |
| Example 5 | 115 | 100 | 0.54 | 91.3 |
| Example 6 | 135 | 24 | 0.45 | 91.4 |
| Example 7 | 155 | 24 | 0.47 | 91.4 |
| Example 8 | 175 | 24 | 0.71 | 91.4 |
| Example 9 | 195 | 24 | 1.73 | 90.8 |

Comparing tables 1 and 2 shows the benefit from an appropriate coating on each side of PEN film which is subjected to an annealing procedure. The optical properties of the coated film are superior to those of the uncoated film as a result of the coating, and this quality is demonstrated at annealing temperatures up to 195° C.

Figure 1:
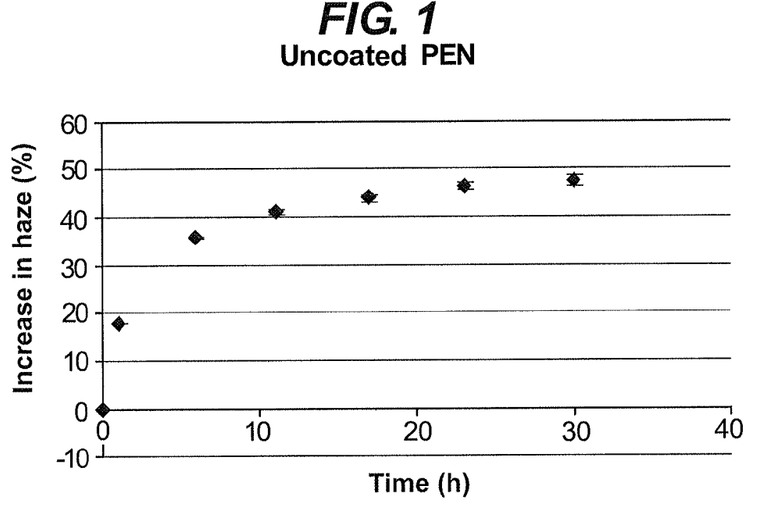
FIGS. 1 and 2 are graphs showing haze increase as a function of annealing time for uncoated PEN and PET films, respectively.
Figure 2:
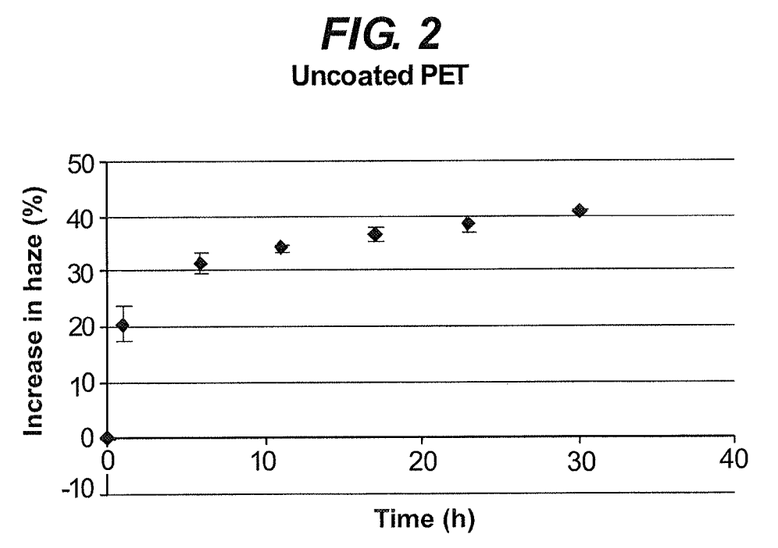

To further investigate the use of coatings to reduce the haze produced in the annealing process, the procedure of control example 1 was repeated with the coating compositions described below in Examples 10 to 16, using PEN and/or PET as the substrate. The PET film was Melinex® ST506 having a thickness of 125 μm, commercially available from Dupont Teijin Films. The final dry coating thickness, after curing/drying, was 2 μm. The coated film was then annealed in an oven for up to 30 hours at approximately Tg+80° C. (i.e. 200° C. for a PEN film; 150° C. for a PET film) and the haze measured over that period. The following results can be compared to:

(i) the uncoated PEN film which exhibited an initial average haze value (i.e. t=0 h) of 1.4% which increased to 48.8% (an increase of 47.4%), as shown in the graph of FIG. 1; and (ii) the uncoated PET film which exhibited an initial average haze value of 0.91% which increased to 41.4% (an increase of 40.5%), as shown in the graph of FIG. 2, when annealed under these conditions. Average haze values were calculated by taking the average of three values measured across the width of the film.

Example 10

Figure 3:
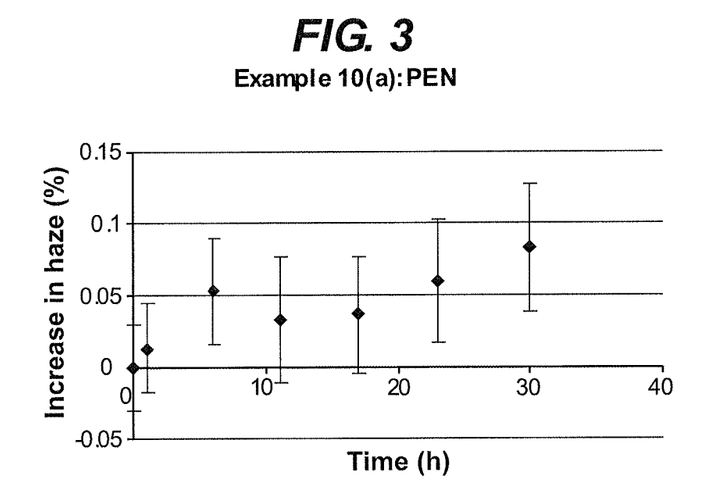
FIGS. 3-10 are graphs showing haze increase as a function of annealing time for several coated PEN and PET films, according to the invention.
Figure 4:
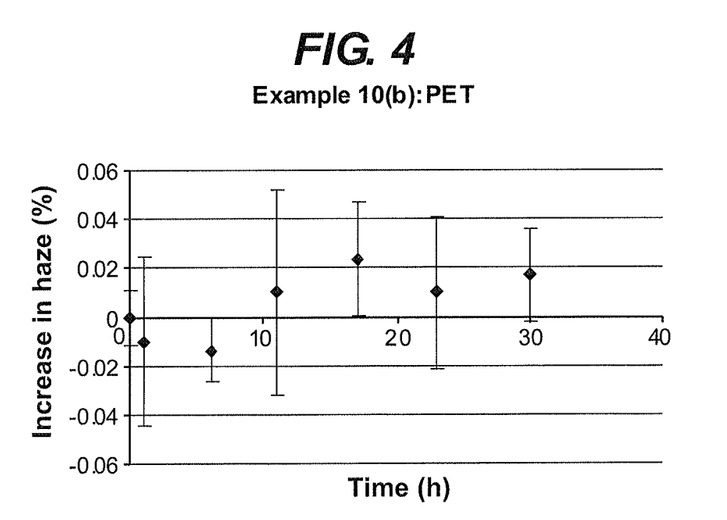

An organic coating composition comprising a mixture of monomeric and polymeric acrylates (including methylmethacrylate and ethylacrylate) and a photoinitiator (Irgacure™ 2959; Ciba) in a solvent of methyl ethyl ketone (2-butanone) was prepared at 26.5 wt % solids (of which about 1% of these solids is the photoinitiator) to a viscosity of about 1.22 cP (centipoise). The coating was dried at 80° C. and then cured by UV-radiation. The haze measurements of the coated film after annealing for up to 30 hours are shown in the graphs of FIGS. 3 and 4. The initial average haze values of the PEN and PET films were 0.74% and 0.48%, respectively.

Example 11

Figure 5:
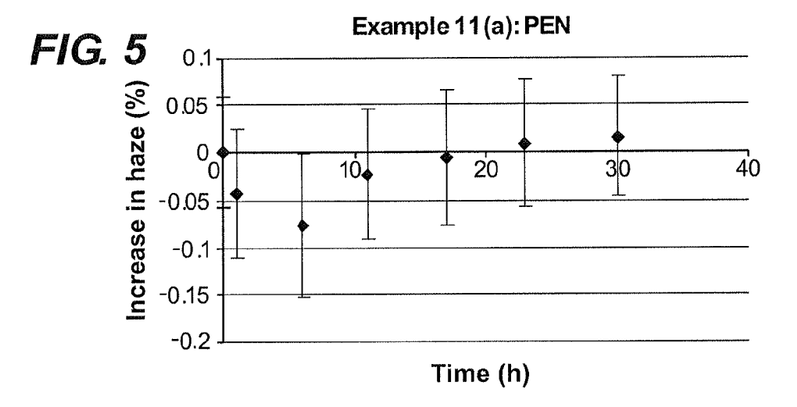
Figure 6:
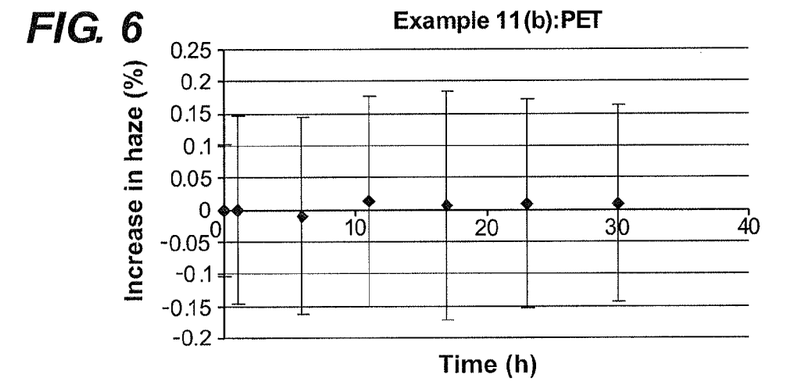

A hybrid organic/inorganic coating composition comprising acrylate monomers and silica particles in MEK solvent was prepared to 10% solids and a viscosity of about 1.7 cP. The coating was applied and then cured immediately by UV-radiation. The haze measurements of the coated film after annealing for up to 30 hours are shown in the graphs of FIGS. 5 and 6. The initial average haze values of the PEN and PET films were 0.88% and 0.53%, respectively.

Example 12

Figure 7:
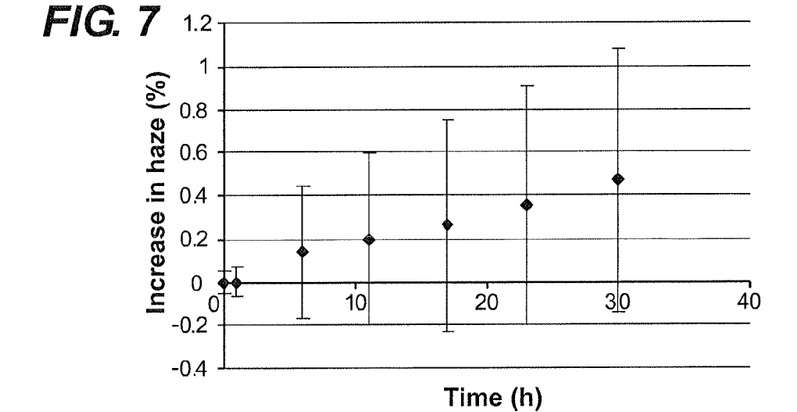

The coating composition of control example 1 was coated onto the PET substrate referred to above, and the haze measurements of the coated film after annealing for up to 30 hours are shown in the graph of FIG. 7. The initial average haze of the film was 0.50%.

Example 13

A coating comprising polyethylene imine (Sigma Aldrich code 181978-8; average molecular weight Mw of about 750,000) and a crosslinker (Cymel™ 385) in water at approximately 5% by weight PEI solids, was coated onto the substrate and thermally cured at 180° C. The haze measurements of the coated film after annealing for up to 30 hours are shown in Tables 3 and 4 below.

TABLE 3

PEI on PEN

| Time (h) | Average Haze (%) | Increase (%) in haze |
|---|---|---|
| 0 | 1.27 | 0 |
| 1 | 1.27 | 0 |
| 6 | 1.30 | 0.03 |
| 11 | 1.36 | 0.09 |
| 17 | 1.41 | 0.14 |
| 23 | 1.43 | 0.16 |
| 30 | 1.42 | 0.15 |

TABLE 4

PEI on PET

| Time h | Average Haze (%) | Increase (%) in haze |
|---|---|---|
| 0 | 4.58 | 0 |
| 1 | 5.43 | 0.85 |
| 6 | 5.58 | 1.00 |
| 11 | 6.38 | 1.80 |
| 17 | 6.28 | 1.70 |
| 23 | 6.81 | 2.23 |
| 30 | 7.80 | 3.22 |

Example 14

Figure 8:
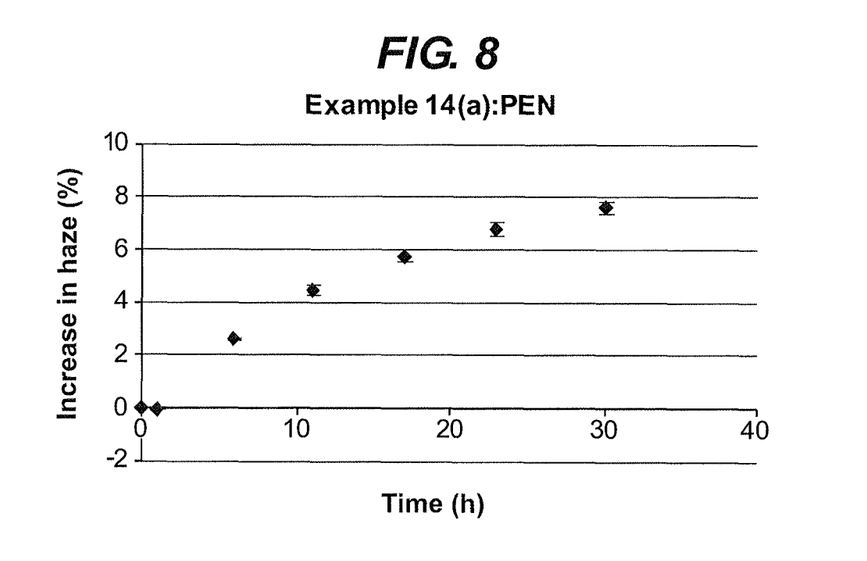
Figure 9:
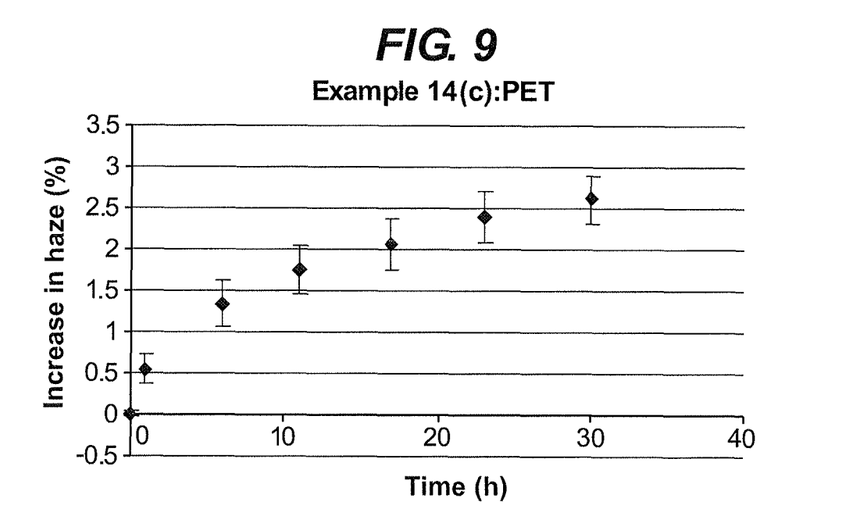

A thermally-curable coating composition comprising epoxy resin in combination with silica particles present at a concentration of about 41% by weight of the solids of the coating composition, which in turn comprises about 10% by weight total solids in an alcoholic solution (a mixed solvent system of isopropanol, n-butanol, ethanol and cyclohexanone). The composition is stirred for 6 hours at room temperature, coated and then thermally cured at 180° C. The haze measurements of the coated films after annealing for up to 30 hours are shown in the graphs of FIGS. 8 and 9. The initial average haze values of the PEN and PET films were 0.65% and 0.45%, respectively.

Example 15

A thermally-curable coating comprising polyester (TPE 62C; Takemoto Oil and Fat Company, Japan), a crosslinker (Cymel™ 385; Cytec) in aqueous solvent (8% total solids, of which 86% is the polyester) was coated onto the PEN substrate and thermally cured at 180° C. The haze measurements of the coated film after annealing for up to 30 hours are shown in Table 5 below.

TABLE 5

| Time (h) | Average Haze (%) | Increase (%) in haze |
|---|---|---|
| 0 | 1.06 | 0 |
| 1 | 0.83 | −0.23 |
| 6 | 3.87 | 2.82 |
| 11 | 5.76 | 4.70 |
| 17 | 7.35 | 6.29 |
| 23 | 8.16 | 7.11 |
| 30 | 9.46 | 8.40 |

Example 16

Figure 10:
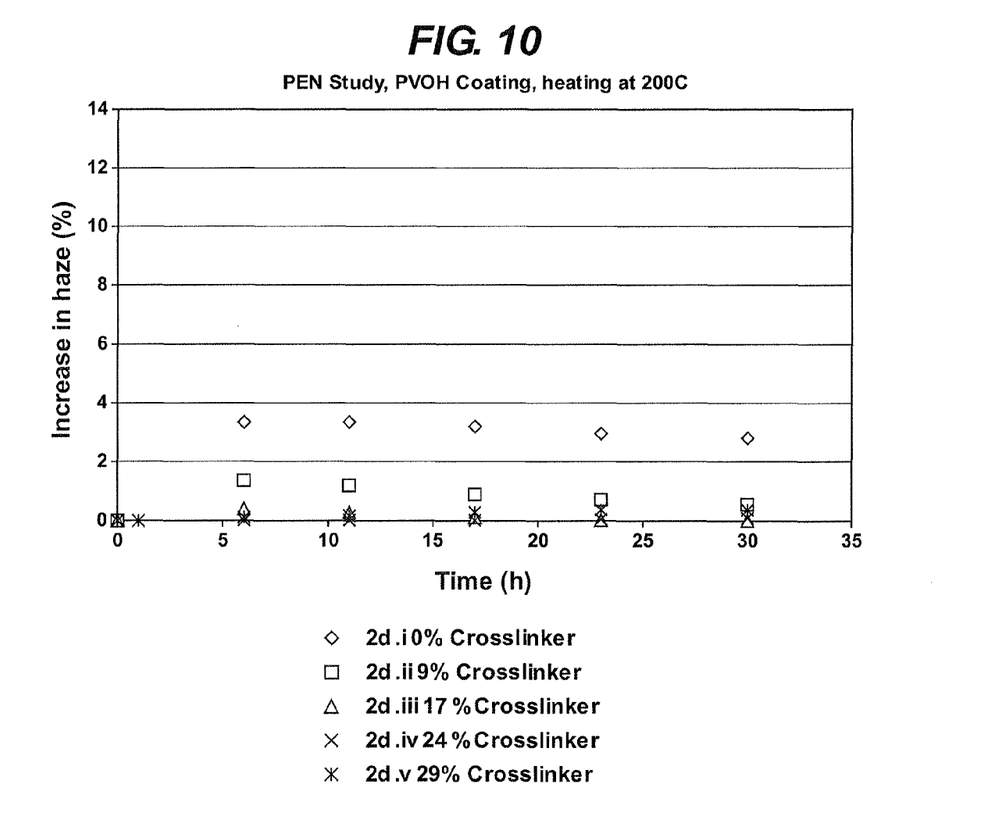

A coating composition comprising PVOH (Airvol™ 24-203; Air Products) at 24% by weight of the coating composition, a surfactant (Caflon™ NP10; Uniqema) at 10% by weight of the coating composition and varying amounts (0 9, 17, 24 and 29% by weight of the PVOH present in the composition) of crosslinking agent (Cymel™ 350; American Cyanamid), in aqueous solvent, was coated onto the PEN substrate and thermally cured at 180° C. The haze measurements of the coated films after annealing for up to 30 hours are shown the graph of FIG. 10. The initial average haze values of the coated PEN films were 0.73% (no crosslinker), 0.74% (9% crosslinker), 0.76% (17% crosslinker), 0.59% (24% crosslinker) and 0.8% (29% crosslinker).

Examples 10 to 16 provide further demonstration of the effectiveness of the coatings described herein to reduce the formation of haze during an above-Tg annealing process, relative to the uncoated films.

The invention claimed is:

1. A method of producing a biaxially oriented composite film comprising a polyester substrate supporting one or more coatings on one or both surfaces of said substrate, wherein said polyester substrate is a biaxially oriented film, said method comprising the steps of:
    disposing on one or both surfaces of said polyester substrate said coating wherein said coating is derived from a predominantly inorganic hardcoat coating composition comprising inorganic particles contained in a polymerisable predominantly inorganic matrix; and
    subsequently annealing said biaxially oriented composite film at a temperature $T_a$ (° C.) above Tg where $Tg<T_a \leq Tg+100$ (° C.) for a time t after thermal equilibrium where 1 hour $\leq t \leq 72$ hours.

2. The method according to claim 1, wherein 1 hour$\leq t \leq 48$ hours.

3. The method according to claim 1, wherein 1 hour$\leq t \leq 24$ hours.

4. The method according to claim 1, wherein after said annealing, the annealed composite film is cooled.

5. The method according to claim 1, wherein said coating is derived from a predominantly inorganic hardcoat coating composition comprising inorganic particles contained in a polymerisable predominantly inorganic matrix selected from polysiloxanes.

6. The method according to claim 1, wherein the coating is derived from a composition comprising:
    (a) from about 5 to about 50 weight percent solids, the solids comprising from about 10 to about 70 weight percent silica and from about 90 to about 30 weight percent of a partially polymerized organic silanol of the general formula $RSi(OH)_3$, wherein R is selected from methyl and up to about 40% of a group selected from the group consisting of vinyl, phenyl, gamma-glycidoxypropyl, and gamma-methacryloxypropyl, and
    (b) from about 95 to about 50 weight percent solvent, the solvent comprising from about 10 to about 90 weight percent water and from about 90 to about 10 weight percent lower aliphatic alcohol, wherein the coating composition has a pH of from about 3.0 to about 8.0.

7. The method according to claim 1, wherein a coating has a dry thickness of from 1 to 20 microns.

8. The method according to claim 1, wherein the annealed and coated film exhibits a haze value of less than 10%.

9. The method according to claim 1, wherein the coated and annealed film exhibits a haze value which is no more than a 10% increase on the haze value of the coated film before annealing.

10. The method according to claim 1, wherein said polyester is poly(ethylene terephthalate).

11. The method according to claim 1, wherein said polyester is poly(ethylene naphthalate).

12. The method according to claim 11, wherein said polyester is derived from 2,6-naphthalenedicarboxylic acid.

13. The method according to claim 11, wherein the poly(ethylene naphthalate) has an intrinsic viscosity of 0.5-1.5.

14. The method according to claim 1, wherein said biaxially oriented polyester film is a heat-stabilised, heat-set, biaxially oriented film.

15. The method according to claim 14, wherein said heat-stabilised, heat-set, biaxially oriented film exhibits one or more of:
    (i) a shrinkage at 30 mins at 230° C. of less than 1%;
    (ii) a residual dimensional change $\Delta L_r$ measured at 25° C. before and after heating the film from 8° C. to 200° C. and then cooling to 8° C., of less than 0.75%; and/or
    (iii) a coefficient of linear thermal expansion (CLTE) within the temperature range from −40° C. to +100° C. of less than $40 \times 10^{-6}$/° C.

16. The method according to claim 1, wherein said biaxially oriented polyester film has a thickness in a range from 25 μm to 250 μm.

17. A biaxially oriented composite film comprising a polyester substrate supporting one or more coatings on one or both surfaces of said substrate,
    wherein said polyester substrate is a biaxially oriented film;
    wherein said one or more coatings is/are derived from a predominantly inorganic hardcoat coating composition comprising inorganic particles contained in a polymerisable predominantly inorganic matrix; and
    wherein the biaxially oriented composite film has been annealed at a temperature $T_a$ (° C.) above Tg where $Tg<T_a \leq Tg+100$(° C.) for a time t after thermal equilibrium where 1 hour $\leq t \leq 72$ hours.

18. The film according to claim 17, wherein 1 hour $\leq t \leq 48$ hours.

19. The film according to claim 17, wherein 1 hour $\leq t \leq 24$ hours.

20. The film according to claim 17, wherein said coating is derived from a predominantly inorganic hardcoat coating composition comprising inorganic particles contained in a polymerisable predominantly inorganic matrix selected from polysiloxanes.

21. The film according to claim 17, wherein the coating is derived from a composition comprising:
    (a) from about 5 to about 50 weight percent solids, the solids comprising from about 10 to about 70 weight percent silica and from about 90 to about 30 weight percent of a partially polymerized organic silanol of the general formula $RSi(OH)_3$, wherein R is selected from methyl and up to about 40% of a group selected from the group consisting of vinyl, phenyl, gamma-glycidoxypropyl, and gamma-methacryloxypropyl, and
    (b) from about 95 to about 50 weight percent solvent, the solvent comprising from about 10 to about 90 weight percent water and from about 90 to about 10 weight percent lower aliphatic alcohol, wherein the coating composition has a pH of from about 3.0 to about 8.0.

22. The film according to claim 17, wherein said at least one coating has a dry thickness of from 1 to 20 microns.

23. The film according to claim 17, wherein the annealed composite film exhibits a haze value of less than 10%.

24. The film according to claim 17, wherein the annealed composite film exhibits a haze value which is no more than a 10% increase on the initial haze value of the coated film before annealing.

25. The film according to claim 17, wherein said polyester is poly(ethylene terephthalate).

26. The film according to claim 17, wherein said polyester is poly(ethylene naphthalate).

27. The film according to claim 26, wherein said polyester is derived from 2,6-naphthalenedicarboxylic acid.

28. The film according to claim 26, wherein the poly(ethylene naphthalate) has an intrinsic viscosity of 0.5-1.5.

29. The film according to claim 17, wherein said polyester substrate is a heat-stabilised, heat-set, biaxially oriented film.

30. The film according to claim 17, wherein said polyester substrate exhibits one or more of:
   (i) a shrinkage at 30 mins at 230° C. of less than 1%;
   (ii) a residual dimensional change $\Delta L_r$ measured at 25° C. before and after heating the biaxially oriented film from 8° C. to 200° C. and then cooling to 8° C., of less than 0.75%; and/or
   (iii) a coefficient of linear thermal expansion (CLTE) within the temperature range from −40° C. to +100° C. of less than $40 \times 10^{-6}$/° C.

31. The film according to claim 17, wherein said polyester substrate has a thickness in a range from 25 μm to 250 μm.

* * * * *